US008838486B2

(12) United States Patent
Kong et al.

(10) Patent No.: US 8,838,486 B2
(45) Date of Patent: Sep. 16, 2014

(54) METHOD AND APPARATUS FOR TIMEKEEPING

(71) Applicants: Cellco Partnership, Basking Ridge, NJ (US); Verizon Patent and Licensing Inc., Basking Ridge, NJ (US)

(72) Inventors: Allen H. Kong, Chester, NJ (US); Hima Rama Subrahmanyam Vishnubhotla, Edison, NJ (US); Ashima Hosalkar, Basking Ridge, NJ (US); Sameer N. Patwardhan, North Brunswick, NJ (US); Tracy Walker, Nazareth, PA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 55 days.

(21) Appl. No.: 13/658,659

(22) Filed: Oct. 23, 2012

(65) Prior Publication Data

US 2014/0114824 A1    Apr. 24, 2014

(51) Int. Cl.
G06F 15/02 (2006.01)
G06Q 10/06 (2012.01)
G06Q 10/10 (2012.01)

(52) U.S. Cl.
CPC .... *G06Q 10/063114* (2013.01); *G06Q 10/1091* (2013.01)
USPC .......................................................... 705/32

(58) Field of Classification Search
CPC .................. G06Q 10/063114; G06Q 10/1091
USPC .............................................................. 705/32
See application file for complete search history.

(56) References Cited

U.S. PATENT DOCUMENTS

| 2009/0086936 | A1* | 4/2009 | Clifford et al. | 379/88.13 |
| 2012/0233044 | A1* | 9/2012 | Burger et al. | 705/32 |
| 2013/0290154 | A1* | 10/2013 | Cherry et al. | 705/32 |

FOREIGN PATENT DOCUMENTS

| CN | 202495096 U | * 10/2012 |
| CN | 202584237 U | * 12/2012 |

* cited by examiner

*Primary Examiner* — Ig T An
*Assistant Examiner* — Michael Maicher

(57) ABSTRACT

For reporting, recording, and/or employee timekeeping, an exemplary time manager interface on a display of a communications device allows an employee to track his or her work time and activities. The time manager interface connects the employee to a central time manager system that tracks and records employee check-in and check-out times. The time manager interface may also permit employees to view their and other schedules. The time manager interface is able to compensate for the time spent initially connecting to the network and launching the interface by recording the network logon time as the check-in time when the difference between the network logon time and the actual reported time is below a predetermined threshold.

19 Claims, 8 Drawing Sheets

METHOD AND APPARATUS FOR TIMEKEEPING

BACKGROUND

Business establishments often use identification badges and time cards to track and manage employee time. Common timekeeping methods use personal computer (PC) terminals and time clocks that are interconnected via wired connections to track employee time. In order to track their time, employees usually gain access to the PC terminal by entering an identification code (and possibly a password) or scanning their identification badge. The PC terminal communicates with the time clocks to obtain timing information and record the employee check in/out time. However, these clock-based systems may be difficult to install, are not always cost-effective, and are often non-portable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
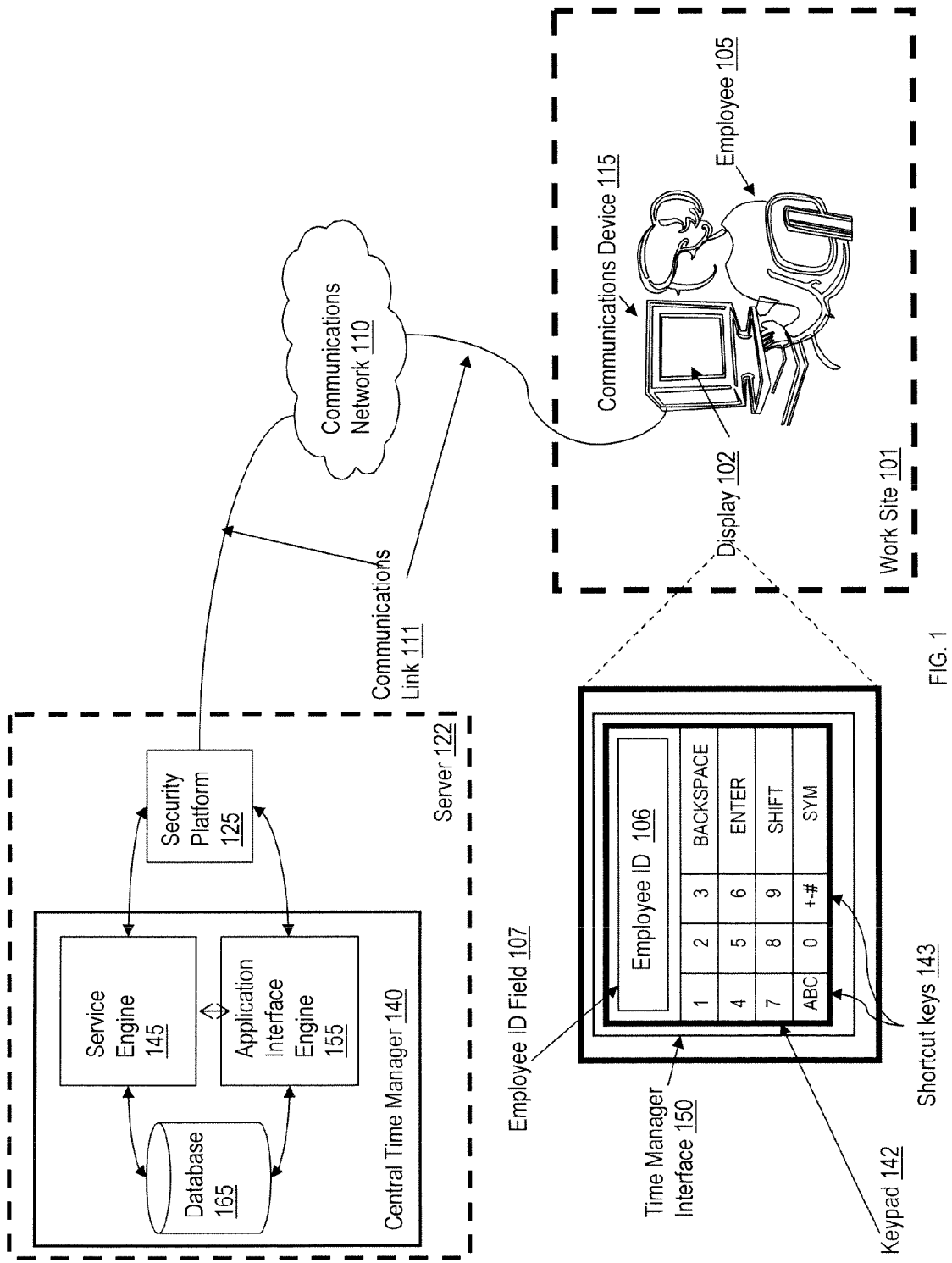
FIG. 1 is an exemplary functional block diagram of a system that is configured to include an employee timekeeping function.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Computer implemented methods, and corresponding systems discussed by way of examples below utilize existing information technology resources of communications devices to monitor, manage, record, and schedule employee work time (e.g., in minutes, hours, etc.). Some examples described herein relate to methods, computer implemented methods, and corresponding systems that, at a terminal positioned at a work site, monitor the time of an employee of the work site with an interface that receives employee check-in and check-out times from an employee. A time difference between a time at which the communications device first gained network connectivity to a communications network and a time at which the employee initiated using the interface for recording employee check-in time is determined, and in the event the determined time difference is below a predetermined threshold, the network connectivity time is recorded as employee check-in time.

Some examples described herein relate to methods, computer implemented methods, and corresponding systems that, at a mobile communications device positioned at a work site, provide an employee of the work site with an interface for use in recording employee check-in and check-out times. The interface includes a field for activation by the employee. The identification information of the communications device is verified and in the event the identification information of the communications device is included in a list that contains identification information of authorized communications devices associated with the work site, the employee check-in and check-out times are recorded in response to activation of the field by the employee.

In one example, in the event the determined time difference is above the predetermined threshold, the time at which the employee initiated using the interface for recording employee check-in time may be recorded as employee check-in time.

In one example, the employee is provided with a field, positioned within the interface, and the employee check-in and check-out times is recorded in response to activation of the field by the employee.

In one example, the geographical location of the communications device is determined, and in the event the geographical location of the communications device is within geographical boundaries of the work site, the employee is authorized to use the interface for recording check-in and check-out times. The GPS location of the communications device may be stored in a database for future audit.

In one example, the identification information of the communications device is determined, and in the event the identification information of the communications device is included in a list that contains identification information of authorized communications devices associated with the work site, the employee is authorized to use the interface for recording check-in and check-out times. In some examples, the list containing the identification information of authorized communications devices associated with the work site is maintained at a database remote from the communications device. The identification information may include at least one of an Internet Protocol (IP) address associated with the communications device, a Mobile Device Number (MDN) associated with the communications device, login ID+password, or Global Positioning (GPS) information of the communications device. In some examples, the communications device is individually assigned to the employee. In such examples, the employee is identified as a function of the identification information of the communications device.

As noted, in some examples, the employee is provided with a field, positioned within the interface. The employee check-in and check-out times may be recorded in response to receiving identification information from the employee. The identification information may include at least one of a typable identification code assigned to the employee, biometric information of the employee, or a printed code assigned to the employee.

FIG. 1 is an illustration of a high level block diagraph of a system for employee time tracking. As shown, an employee 105 may utilize a communications device 115 to track and record his/her time into a time manager interface 150. Application software (not shown) enables the communications device 115 to provide a time manager interface 150 via the input/output elements of the particular type of communications device 115. The drawing illustrates an example of a graphical user interface (GUI) implementation of the time manager interface 150, as may be shown to the user/employee 105 via the display of the communications device 115. The time manager application software need not to be hosted or executed on the communications device 115 and may be hosted remotely from the communications device 115. For example, the time manager application software may cause the device 115 to communicate through a wired or wireless communications link 111 with a central time manager system 140. The central time manager system 140 is responsible for monitoring, tracking, managing, and recording employee work-related activities and the times associated with these activities.

Although not shown, in some examples, the central time manager 140 may serve multiple work sites 101 of a work establishment (e.g., various storefronts of a company) that may be located in various geographical locations (e.g., a company having storefronts across a city, state, country or even the world). For example, the central time manager 140 may serve work sites 101 of multiple work establishments (e.g., storefronts of multiple companies). Although shown as a single instance, the central time manager 140 may be implemented on multiple networked computer platforms in a distributed manner, e.g. to provide redundant capacity in the event of network or platform failure and/or to provide sufficient capacity for the central time manager functionality for a large workforce of a large enterprise type employer.

Although each establishment being monitored by the central time manager 140 may have employees that are paid based on reported and/or recorded work hours (hereinafter referenced as non-exempt employees) and those who are salaried and are paid a predetermined salary regardless of the hours worked (hereinafter referenced as exempt employees), the term employee 105, as used herein, refers to those employees that are paid based on their reported and/or recorded work hours (non-exempt employees).

As stated above, the employee 105 may use the communications device 115 to track and record his/her time into the time manager interface 150 and indicate that he/she intends to begin (i.e., check-in) or end (i.e., check-out) a work session at the work site 101 of the work establishment (not shown). The term work session, as used herein, refers to a period of time that the employee 105 is working at the work site 101 and should be reimbursed for the work performed.

The communications device 115 may be a mobile (e.g., wireless) or non-mobile (e.g., desktop) communications device 115. Examples of the communications devices that may be used with the systems and methods disclosed herein include, but are not limited to, personal computers, desktop computers, mobile phones, Personal Digital Assistants, tablet computers, laptop computers, etc.

The communications device 115 may include a display 102 for displaying screen content (e.g., images). The display 102 may be a built-in integral display that is coupled wirelessly or through a physical connection (e.g., network connection) with the data processing components of the communications device 115. For example, the display 102 may be a touch screen display that detects the presence of pressure and location of a touch within the display area. The touch screen may respond to being touched with various objects, such as fingers, hands, or a stylus.

In one example, the communications device 115 is coupled with one or more peripheral devices (not shown) that facilitate employee interaction with the computing device. The peripheral devices may be built-in units or be coupled with the data processing components of the communications device 115 wirelessly or through a physical connection (e.g., a network connection). Examples of the peripheral devices include, a mouse, keypad, and/or printer.

In one example, the communications device 115 may include one or more audio I/O devices (e.g., microphone, speaker, etc.). In one example, at least one of the audio I/O devices may be a built-in I/O device. In one example, at least one audio I/O device is a separate unit that is coupled wirelessly or through a physical connection (e.g., a network connection) with the data processing components of the communications device 115. In one example, the communications device 115 may include video capabilities. The video capabilities of communications device 115 may be provided by a built-in video module or be provided by an independent video module that is coupled with the communications device 115 wirelessly or using a physical connection (e.g., network connection).

In one example, the communications device 115 is permanently mounted at a location in the work site 101 such that it is accessible by the employees. In one example, the communications device 115 is positioned in the work site 101 such that it is intended not to be removed from its designated location. In one example, the communications device 115 is installed at the work site 101 upon establishment of the work site 101 in order to prevent installation of other time management devices at the work site 101.

In one example, the communications device 115 is mobile. For example, the communications device 115 is a mobile communications device that can maintain connectivity and management functions while being moved within the physical boundaries of the work site 101 and its authorized surroundings (e.g., outside the worksite by personnel that serve as technicians that may travel from job site to job site). The mobile communications device 115 may have limited connectivity ability (e.g., WiFi only) or may be able to connect via different networks (e.g., WiFi and cellular). In one example, global positioning (GPS) information is used to restrict the usage of the mobile communications device 115 to the physical boundaries of the work site 101 and its immediate surroundings. Alternately, use of the software enabling the employee to check-in and check-out may be geographically restricted even though other functionality of the mobile communications device may not be restricted. For example, GPS locations of the physical boundaries of the work site 101 is determined by the communications device 115 (or by an external device and then sent to the communications device 115) and the communications device 115 is programmed such that it is used for tracking and recording employee time while within the boundaries indicated by the GPS information of the work site 101. The communications device 115, in one example, may be a device that is dedicated to time entry or to entry of work-related activities for all employees and thus be enabled to run limited software (such as that for time entry, Office suite products, etc. . . . ).

As previously stated, the employee 105 may use the time manager interface 150 appearing on the display 102 of the communications device 115 to indicate that he/she intends to begin or end a work session. In response, the time manager interface 150 and the underlying time manager application software (not shown) may communicate with the central time manager 140. As noted previously, the central time manager 140 is responsible for monitoring, tracking, managing, and recording employee work-related activities and the times associated with these activities. The central time manager 140 may be remote from the communications device 115, for example at a server, and be connected to the communications device 115 via a communications network. Although not shown, in one example, the central time manager 140, or parts thereof (e.g., physical or implemented in software), may be within the communications device 115.

Regardless of where the central time manager 140 is positioned, the employee 105 may be uniquely recognized by the central time manager 140 using employee identification information (e.g., login ID+password or employee ID 106) entered into the time manager interface 150. For example, the employee ID 106 is a numerical, alphanumerical, or an alphabetical employee ID 106. The employee ID 106 may be assigned by the establishment that operates the work site 101 (e.g., an employee number assigned to the employee 105) or be a function of the previously known information about the employee 105 (e.g., based on the employee initials or a function of his/her name, date of birth, or social security number). Regardless of its format, the employee ID 106 is a unique identifier that is used to uniquely identify the employee 105 across all work sites 101 and establishments monitored by the central time manager 140.

In one example, each employee 105 is assigned an employee ID 106 that is unique across all work sites 101 and establishments managed by the central time manager 140. For example, each employee 105 may be uniquely identified using his/her social security number. Alternatively, the employee ID 106 assigned to an employee 105 may only be unique within the employee's work site 101. In another example, the employee ID 106 may only be unique within predetermined work sites, e.g., all work sites within a predetermined geographical range of the employee's 105 usual work site (e.g., same town or city) or all work sites at which the employee is authorized to work by a superior. For example, the central time manager 140 may uniquely identify each employee 105 as a function of the work site 101 and/or the establishment at which he/she works. For example, the central time manager 140 may assign a unique identifier (not shown) to each work site 101 and utilize a combination of the work site identifier and the employee ID 106 to uniquely identify the employee 105. An employee 105 may be assigned an employee ID 106 of SAB and working at a work site 101 to which identifier number 12 has been assigned, may be uniquely identified by the central time manager 140 as 12SAB. Each establishment operated by the central time manager 140 may also be assigned an identifier.

In one example, the central time manager 140 may identify a work site 101 as a function of the Internet Protocol (IP) addresses assigned to the communications devices 115 utilized at that work site 101. Further, in one example, when utilizing a mobile communications device 115, the mobile device number (MDN) of the communications device 115 may serve as a communications device identifier. For example, the central time manager 140 may maintain a list of the IP addresses or mobile device numbers used by the communications devices 115 located at each work site 101. This list of the utilized IP addresses may be maintained in a database 165 included in the central time manager 140. When the employee 105 utilizes the communications device 115 to indicate to the central time manager 140 that he/she intends to begin or end a work session, the central time manager 140 detects the IP address of the communications device 115 utilized by the employee 105. The detected IP address is verified against the list of utilized IP addresses at each work site 101 and if a match is obtained, the work site 101 is identified and authenticated. Once the work site 101 is identified and authenticated, the employee 105 may be uniquely identified as a function of his/her employee ID 106 and the identified work site 101.

In one example, the employee 105 may record his/her work start and stop times (e.g., check-in and check-out times) using an individually assigned communications device 115. In this regard, no further information may be required from the employee 105 and he/she may be uniquely identified, upon identification of his/her individually assigned communications device 115. It will be understood that some businesses track work from arrival at the start of the day (e.g., punching-in) to departure at the end of the day (e.g., punching-out) while other businesses track time in a more granular way, based on time spent during the day on various tasks, projects or assignments. The personal communications device 115 may be used to capture the time in the more granular way as well. For example, the different projects can be entered in the communications device 115.

In one example, the employee ID information (e.g., number) is captured from a unique barcode or a quick response (QR) code that has been assigned to the employee 105. The barcode and/or the QR code may be printed on an employee badge or stored digitally in a device (e.g., the employee's mobile phone) that may be able to display the code or barcode.

In other examples, biometric information associated with the employee 105, rather than an ID code, is used. For example, information such as employee voice, facial features, facial photo, fingerprint, handprint, or iris characteristics may be used to uniquely identify the employee 105.

As explained above, the employee ID 106, regardless of the its format, is entered into the time manager interface 150 and used to uniquely identify the employee 105 and track the date and/or time at which he/she starts or ends a work session.

The time manager interface 150 provides the employee 105 with a medium for entering his/her employee ID 106. As noted, in one example, the time manager interface 150 may be the user interface of an underlying time manager application software (commonly referred to as an app, not shown) that is responsible for receiving the employee ID 106 from the employee 106.

As shown in FIG. 1, the time manager interface 150 may include an employee ID field 107 for receiving the employee ID 106 from the employee 105. Depending on the employee ID 106 format used, the employee ID field 107 may be configured to receive various forms of input. In examples which limit the employee ID 106 to having a predetermined limited number of alphanumerical characters, to avoid incorrect entries, the employee ID field 107 may be limited such that it may only receive the limited number of alphanumerical characters. For example, the employee ID field 107 is an activation button that is activated in response to receiving an input (e.g., mouse click or touch) from the employee 105.

The time manager interface 150 may use various mediums for receiving the employee ID 106 from the employee 105. For example, when operating with an employee ID 106 that is entered using a keypad, the time manager interface 150 may receive the employee ID 106 information through a peripheral device, such as a separate physical keypad (not shown), coupled with the communications device 115. In one example, the employee ID 106 need not be entered; instead, the ID 106 is derived from prior login information (e.g. login ID and password, where the login ID may be different from the employee ID 106).

In one example, the time manager interface 150 may display a keypad 142 for use in entering the employee ID 106. In one example, the keypad 142 may appear on the display 102 in response to activation of the employee ID field 107 by the employee 105. In one example, the employee ID field 107 is activated in response to a mouse click on the employee ID field 107 or in response to touching of the employee ID field 107 when using a touch activated implementation of the display 102. In one example, the keypad 142 may appear on the display 102 upon launching the time manager interface 150. As noted previously, in one example, the time manager interface 150 does not require a keypad and is arranged to only include an activation button. Although activation buttons may be used, the employee ID field 107 itself may be used by the employee 105 to initiate his/her check-in or check-out procedures by clicking in the field (and/or pressing in that field via touch-screen).

The keypad 142 may be presented to the employee 105 in any manner known in the art. In one example, the keypad 142 may display limited characters. When the employee ID 106 includes numerical characters, to reduce possible errors in entering the employee ID 106 (e.g., inadvertent entry of alphabetical characters or symbols), the keypad 142 may be limited to including only numerical characters.

In examples that use employee IDs 106 that include barcodes, QR codes, or biometric information, the employee ID field 107 is arranged to receive such information. For example, the employee ID field 107 may appear on the display 102 of the communications device 115 as an interactive field and the user is asked to align his/her barcode, QR code, or biometric information source (employee's iris or finger) such that it is completely contained within the employee ID field 107. Once completely aligned, the employee ID 106 is read by the time manager interface 150 by the appropriate input mechanism on the device 115 (such as a camera, fingerprint scanner, near field communication or NFC device, etc.).

In one example, the keypad 142 includes shortcut keys for accessing other keypad screens that include characters not included in an originally displayed screen. For example, as shown in FIG. 1, the keypad 142 may include keys for entering numerical characters (e.g., 0, 1, . . . , 9), general keys (e.g., shift, backspace, enter, SYM, etc.), and shortcut keys 143 for accessing alphabetical characters (e.g., A, B, . . . , Z) and other characters and symbols (e.g., +, −, &, @, etc.).

In one example, the keypad 142 is a touch sensitive keypad 142 that responds to touch and pressure (e.g., by fingers, hands, or a stylus). Additionally or alternatively, the keypad 142 may be used in combination with peripheral devices, such as a keypad or a mouse, which are coupled with the communications device 115.

As noted, the time manager interface 150 may use various mediums for receiving the employee ID 106 from the employee 105. For example, when using a tablet as a communications device 115, a keypad may be used. For a mobile phone communications device 115 a login ID, password, and employee ID 106 may be used before further functionality is made available. For a personal computer (PC) communications device 115, an clickable icon may be used to communicate the employee ID 106 to the central time manager 140 over the communications network 110. For example, when operating with employee IDs 106 that include QR codes, barcodes, or biometric information, in addition or in place of the employee ID field 107, the time manager interface 150 may be coupled with a microphone (not shown), camera (not shown), scanner (not shown), or a barcode reader (not shown) that reads the barcode, QR code, or the biometric information.

In one example, if a communications device 115 is designated for use by some employee 105, the time manager interface 150 is arranged such that the employee 105 no longer needs to enter his/her employee ID 106 into the time manager. For example, the employee 105 is able to record his/her time by simply activating the employee ID field 107 (e.g., provided as an activation button) and without having to enter his/her employee ID 106.

The employee ID 106 or related information, once obtained by the time manager interface 150, is forwarded, via one or more communications links and through a communications network, to the central time manager 140 for monitoring and recordation. In one example, information other than the employee ID 106 may also be forwarded to the central time manager 140. For example, information regarding the date and/or time at which the employee 105 has entered his/her employee ID 106 into the time manager interface 150 is forwarded to the central time manager 140. Other instances of date and/or time may be reported. For example, the time at which the employee 105 initiates the usage of the communications device 115 is recorded (e.g., by sending the time information to manager 140 for recording). For example, if it is detected that the communications device 115 was not turned on prior to being accessed by the employee 105 and/or had to be booted up by the employee 105 (e.g., if the employee 105 is the first person to enter his/her time that day or if the system was turned off or had to be rebooted), the time that the communications device 115 was turned on or booted by the employee 105 is forwarded to the central time manager 140. Additionally, in one example, the time at which the communications device 115 first gained network connectivity is be reported. This time may be used instead of, or in conjunction with, the time indicated by the employee ID 106 entered into the time manager interface 150 to obtain a more proper estimate of the time the employee 105 arrived/left the enterprise.

In one example, some thresholds are applied in time recordation. For example, a time difference of up to thirty minutes may be allowed between the boot time or network access time and the actual time entry by the employee 105. For example, when the user clicks on the employee ID field 107, the network login time is determined from the PC. The login ID and the network login time are sent to the central time manager 140 over communications network 110. If the current time (e.g., time of the punch in) is within a predetermined time (e.g., 30 min) of the network login time and if the punch in is the first punch in of the day, the current time is recorded as the network login time. Otherwise, the actual time of the punch in is recorded.

In one example, a time difference between the time that the computer first gained network connectivity or was first booted and the time at which the employee 105 initiated recording his/her time may be determined. This calculation of the time difference may be done in a processor (shown later in connection with FIG. 2) of the communications device 115 and in response to instructions included in the time manager application software. Once the time difference is determined, it may be compared against a threshold (e.g., thirty minutes). If below the threshold, network or boot time may be recorded as the time the employee 105 began a work session. If above the threshold, actual employee check-in time may be recorded as the time the employee 105 began a work session. It will be understood that a subsequent user of the computer will not receive the benefit of the boot time (unless the computer is indeed booted up again). The threshold may be set by an authority operating or overseeing the operation (i.e., a person) of the work site 101 or a parameter set at a national level. In one example, employee time is rounded up or down to the nearest minute.

In one example, the date and/or time information are determined based on the local time indicated by an internal clock of the communications device 115. In one example, a network time protocol is used by the communications devices 115 connected to the communications network 110 to synchronize all connected communications devices. The date and time information, as indicated by the synchronized computers of the network, may be utilized for timekeeping purposes. In one example, the date and time indicated by the base stations of a mobile network are utilized to track employee activities.

The communications device 115 and the central time manager 140 may communicate directly or through intermediary communications devices. For example, as shown in FIG. 1, the central time manager 140 is implement as programming on a network connected computer configured as server 122 in communication with the communications device 115 via a communications network 110. A network or host computer platform typically may be used to implement a server, with respect to client programming on user terminal devices, although a server for one service may be client for another service. A computer or the like with user interface elements, such as a personal computer or other type of work station or terminal device, often is programmed with appropriate client software, although for at least some purposes, such a computer or the like also may act as a server. In the example, the computer configured as the server 122 is programmed to implement the central time manager 140; and the computer or the like serving as the device 115 is programmed to act as a client with respect to the server 122 and its central time manager 140. The relevant client software may be part of or interact with the time manager application software by which the device 115 provides the time manager interface 150. In one example, the communications device 115 and the central time manager 140 may communicates through secure and/or encrypted communications links. However, in some instances, the server and associated manager functions may be implemented on the same platform or device 115 that implements the time manager interface 150.

The communications network 110 may be a high-bandwidth and/or band-limited communications network. In one example, the communications network 110 may be a wireless communications network. In one example, the communications network 110 is a local area network (LAN), metropolitan area network (MAN), or a wide-area network (WAN), such as the Internet. In one example, the network 110 may include one or more segments of one or more general purpose network (e.g., Internet, LAN, etc.) and/or other networks (e.g., Internet protocol (IP) network). Depending on the type of communications device 115 used (e.g., mobile or a network device), the communications device 115 and the central time manager 140 may communicate through appropriate communications links 111 (e.g., wireless and/or wired communications links) and appropriate communication networks 110.

As explained previously, the time manager interface 150 may be an interface of the time manager application software (not shown). In one example, the time manager application software may implement the appropriate procedures for obtaining the employee ID 106 and other information (e.g., date and time) and forwarding the obtained information to the central time manager 140 on the server 122 via the network 110.

In one example, a security platform 125 may host and/or validate the time manager application software 140. In one example, the security platform 125 is an enterprise mobility platform that is responsible for building, deploying, managing, and/or updating the time manager application software simultaneously across various communications devices. In one example, the enterprise mobility platform does not have any logic for time management. Instead, it authenticates the employee logging into the system and forwards the check-in request to the central time manager 140.

In one example, the security platform 125 maintains some information regarding the work sites 101 that are being managed by the central time manager 140. Further, in one example, some information regarding the communications devices 115 deployed at each of the managed work sites 101 is maintained. As explained previously, in one example, the security platform 125 maintains a list of authorized IP addresses that include the IP addresses and/or the GPS information associated with all deployed communications devices 115.

In one example, the information maintained by the security platform 125, relating to the work sites 101 and their associated communications devices 115, is used by the security platform 125 to identify the work site 101 and/or validate the communications device 115. For example, the security platform 125 may validate the communications device 115 by checking its IP address against the list of authorized IP addresses to determine if the communications device 115 is authorized to communicate with the central time manager 140.

In one example, the security platform 125 may determine the geographical location of the communications device 115 and validate the communications device 115 by verifying that the communications device 115 is positioned within its intended physical boundaries. For example, assuming that a mobile communications device 115 is being used, the security platform 125 may determine the geographical location of the communications device 115. The security platform 125 may utilize various mobile tracking schemes. For example, the cell phone network may determine location information through multilateration of radio signals between radio towers of the network 110 and the communications device 115 to provide the geographical location of the communications device 115. In another example, the communications device 115 has a GPS receiver and the platform 125 receives the latitude/longitude coordinates determined by the GPS receiver or receives GPS signal measurements that the server 122 uses to calculate the latitude/longitude for the communications device 115. Once the geographical position of the communications device 115 is obtained, the security platform 125 may determine whether the obtained geographical position of the communications device 115 is included in the physical boundaries of the work site 101. Thus, the platform 125 is identifying the worksite from this location. If within the physical boundaries, the communications device 115 is validated and may be used for tracking and timekeeping of employee activities. In one example, if the security platform 125 determines that the communications device 115 is outside of its intended boundaries, an error message indicating the failure to validate the communications device 115 is relayed to the employee 105 through the time manager interface 150. The error message may also be stored and/or transmitted to other personnel of the employer such as a supervisor of the employee 105, for further review or action.

Further, in one example, the security platform 125 may utilize its knowledge of the IP addresses of authorized computers at each work site 101 to impose some restrictions on the communications device 115. For example, when an employee 105 tries to launch the time manager application software, a request to launch the time manager application software including the IP address of the communications device 115 is forwarded to the security platform 125. The security platform 125, in response, verifies the IP address of the communications device 115 to determine if it is an authorized IP address. If so, the security platform 125 sends a response to the communications device 115 indicating that access is granted and, upon receiving the response, the time manager interface 150 is launched by the communications device 115. If not, the security platform 125 sends a response to the communications device 115 indicating that access is not granted and, upon receiving the response, the time manager interface 150 is unable to be launched. In one example, notification is shown on the display 102 as to the reason why the time manager interface 150 is unable to be launched.

In one example, in addition to verification of the communications device 115, the employee ID 106 is also be verified. The verification of the employee ID 106 is done at the communications device 115 and/or using a module positioned within the communications network 110 (not shown) or in the server 122. Regardless of the location where the employee verification is performed, verification may be done by accessing a database that contains employee information and verifying the employee ID 106 against the information in the database. The database may include employee ID 106 and schedule, for each employee who is authorized to work at a work site 101. In one example, the database further includes information identifying the work sites 101 at which each employee 105 is authorized to report for work. In order to verify the employee ID 106, the employee ID 106 received from the employee 105 may be checked against the database to determine if a match to the database exists. If a match exists, the employee ID 106 is verified as a valid employee ID 106. Otherwise, if a match does not exist, the employee ID 106 is determined to be invalid. In such a case, an error message may be relayed to the employee 105, via the communications device 115 and/or the time manager interface 105, indicating that the employee ID 106 has been deemed invalid. In one example, in addition to verifying the employee ID 106 to ensure that it is included in the list of authorized employees 105, the employee schedule (not shown) may also be evaluated to determine if the employee 105 is authorized to begin and/or end a work session at that time. Furthermore, in one example, the database of authorized work sites 101 may be accessed to determine whether the employee 105 is authorized to work at the work site 101 where time recordation is being requested.

In one example, the database including the information used for employee verification is maintained within the communications device 115. In one example, this database is maintained within a component connected to the communications network 110. In one example, the database is maintained by the central time manager 140 (i.e., database 165 in server 122).

In one example, the procedures for verifying the employee ID 106, the employee schedule, and/or the appropriate work site 101 to which the employee 105 is assigned for work are implemented and carried out in the communications device 115. In one example, the module that implements and carries out the required procedures is a component connected to the communications network 110 (i.e., security platform 125). Alternatively or additionally, in one example, the central time manager 140 includes an access manager (not shown) that implements and/or carries out the required procedures for verifying the employee ID 106, employee schedule, and/or employee work site 101.

In one example, the central time manager 140 includes a service engine 145 that interacts with the security platform 125 to receive the information (e.g., employee ID 106, date and time information, etc.) forwarded by the communications device 115 to the central time manager 140 after successful completion of the applicable security procedure(s). The service engine 145 is a web service layer interacting with the central time manager 140 for all the time entry information. Further, in one example, the service engine 145 may utilize the database 165 to uniquely associate the employee 105 and the received information.

In one example, the information received by the service engine 145 is interpreted prior to being associated with the employee 105. In examples that utilize employee IDs that include a QR code or a barcode, the service engine 145 may include or be coupled with a module on the communications device 115 that provides the appropriate functions for interpreting the barcode or the QR code. Similarly, in examples that utilize biometric information, a module (not shown) that provides the required functions for interpreting the biometric information and using the interpretations to uniquely identify the employee 105 is utilized.

In one example, the service engine 145 may utilize the database 165 to maintain previously obtained information for each employee 105 and each work site 101. In examples that use biometric information to identify the employees, the database 165 may include biometric information (e.g., fingerprint or voice sample) that has been previously obtained from the employee 105. Upon receiving the information forwarded by the communications device 115 (e.g., upon receiving a recently obtained fingerprint or employee ID 106), the service engine 145 accesses the database 165 to determine whether a corresponding previously stored value of the received information (e.g., previously obtained fingerprint or employee ID 106 that have been saved in the database 165) matches the received information. If a match is obtained, the employee 105 is uniquely identified. If a match is not obtained, an error message indicating the failure to uniquely associate the employee 105 with the information in the database is relayed as above to the employee 105 through the time manager interface 150.

In the event a match to the database 165 is obtained, the service engine 145 records the date and/or time information at which the employee 105 is attempting to start or end a work session. In one example, the data and/or time information are stored in an area of the database 165 designated for timekeeping. For example, the particular worksite and/or location is recorded (e.g., when employees work at different employer/customer sites). The worksite ID and/or location information gets through to the central time manager 140 through the communications network 110 and recorded.

In one example, the service engine 145 may utilize the information received from the communications device 115 to determine whether the employee 105 is eligible for starting and/or ending a work session. For example, in one example, the service engine 145 may access a list of employees that are authorized to work at each work site 101. Additionally or alternatively, the service engine 145 may maintain work session schedules assigned to each employee 105 at the work site 101. The list of authorized employees and/or their assigned schedules are maintained in the database 165 of the central time manager 140.

In one example, upon receiving the employee ID 106 and other relevant information (e.g., employee ID and/or login ID), the service engine 145 may verify the received information against a list of authorized employees and their assigned schedules to determine if the employee 105 is authorized to start and/or end a work session at the requested work site 101. The list of authorized employees and their assigned schedules may be maintained in the database 165. If authorized, the central time manager 140 signals the time manager interface 150 that the employee 105 has been verified and authorized. The time manager interface 150, in response, may issue an announcement to the employee 105, confirming that he/she has been verified and may start or end a work session. Alternatively or in addition, a different device may be used for this notification, i.e., the employee ID 106 may be entered on a dedicated communications device 115 at the work site 101 and the notification provided on the communications device 115, the employee's communication device (e.g., mobile phone), and/or the communication device (e.g., mobile phone) of the employee supervisor. Notification may also be provided via email, text message, voicemail message or any other predetermined manner. Where a notification is provided to another device, the information (e.g., in the database 165) about or associated with the employee that has just checked in or out via the interface 150 on the device 115 would identify and/or include an address for each additional or alternative device that should receive notifications about the employee's activities and time records.

As noted above, some establishments may classify or categorize the employees into categories including exempt employees (i.e., salaried employees) and non-exempt employees (e.g., hourly paid employees). In such examples, the central time manager 140 may maintain a listing of the classes or categories to which each employee 105 belongs. The listing of the classes or categories may be maintained in the database 165. For example, in the event the service engine 145 determines that an exempt employee 105 is trying to use the communications device 115 to record the start and/or end of a work session, an error message is issued to inform the employee 105 that he/she is not authorized to use the central time manager 140 for time and/or date recordation. In one example, the time manager interface 150, in response to an appropriate message or command from the central time manager 140, issues the error message to the employee using an audio message and/or by displaying an error message on the display 102 of the communications device 115. As in several of the other notification examples, the central time manager may send a message or command to provide the notification, to another communication device of the employee different from communications device 115.

In one example, a confirmation is issued to the employee 105 once the employee ID 106, and other information such as the employee schedule, are authenticated. The confirmation may be in form of a message that is relayed to the employee 105 on the display 102 of the communications device 115 and/or via a communication device of the employee (if different from communications device 115). An audio announcement, text message or video message, providing the confirmation notification, may be used to confirm that the employee 105 has successfully recorded his/her start or end of the work session. In one example, the time manager interface 150 may be responsible for relaying the confirmation message to the employee 105. For example, the time manager interface 150 may play an audio announcement (e.g., including the employee name or employee ID 106) or visually display an announcement (e.g., including the employee name or employee ID 106) on the display 102 of the communications device 115 to confirm that employee 105 time has been successfully recorded.

In one example, other employee identifiers such as employee name are included in the notification announcement or display. Further, the recorded date and/or time and/or location may also be included in the confirmation presentation to the employee.

As stated previously, in one example, in the event the authentication of employee ID 106 is not successfully completed, the time manager interface 150 indicates the failure to authenticate to the employee 105 through an error message (e.g., timeout entry completion, network connection issues, etc.). In one example, the error message is included in an audio message. In one example, the error message is included in a visual message that is displayed on the display 102 of the communications device 115.

In one example, the central time manager 140 includes an application interface engine 155 that is responsible for customizing the application software that is used with the examples described herein. The customization of the application software is done to increase the performance of the central time manager 140. For example, the customization is performed at the application programming interface (API).

In one example, the employee 105 uses the time manager interface 150 for reasons other than tracking the beginning and end of a work session. For example, the employee 105 may utilize the time manager interface 150 for viewing his/her work schedule. Thus, the time manager interface 150 may provide the employee 105 with a field, menu or icon (not shown) for selecting an option for viewing work schedules. Once in the work schedule screen (not shown), in one example, the employee 105 may be allowed to select among various schedule viewing options. For example, the employee 105 is able to select between viewing his/her schedule and/or schedules of other employees 105 if the employee 105 has access to the other schedules as well as from various formats for viewing of the requested schedule(s). Additionally or alternatively, the time manager interface 150 may provide the employee 105 with a list of employees and request that the employee 105 selects the employee 105 whose schedule he/she wishes to view. The list may contain information indicating whether the employee 105 is permitted to view the schedule of another employee (such as allowing the other employee's schedule to be selectable or providing a separate tag next to each employee's name indicating whether they are able to be viewed) or merely not providing the identities of employees that the employee 105 is not permitted to view. The time manager interface 150 and the time manager application software may obtain the required information for displaying the employee schedule from the central time manager 140. For example, the time manager application software may submit a request for the employee schedule to the service engine 145. In response to the request, the service engine 145 may access the database 165, obtain the requested employee schedule, and forward the obtained schedule, via the communications network, to the time manager interface 150. The time manager interface 150 may subsequently display the schedule forwarded by the service engine 145.

Further, the employee 105 may use the time manager interface 150 to view the number of hours he/she has worked, has been away within a given time frame (e.g., over a day, week, or month), or the date and time that he/she has started or ended a work session. For example, the time manager interface 150 may provide the employee 105 with a field, menu or icon (not shown) that upon selection causes the interface 150 to display the requested employee hours, including if appropriate input of a desired time frame. The requested employee hours may be obtained by submitting a request for the hours to the service engine 145. The service engine 145, in response, accesses the database 165 to obtain the time recorded for the employee 105 within the requested time frame. This information is relayed back to the time manager application software and displayed by the time manager interface 150 on the display 102 of the communications device 115.

Furthermore, in one example, the time manager interface 150 is used to create employee schedules. For example, the time manager interface 150 may display an image of available time slots that employees are scheduled to work. The available time slots may be displayed over various time frames. For example, the available time slots for a day, week, and/or a month are displayed. For example, employees may insert their employee ID 106 into time slots (indicating that they are available for work during those time slots). This information is stored in the database 165. In one example, the service engine 145 creates schedules according to known load-leveling methods based on these populated time-slots. Thus, employees may be selected for scheduling from a list of employees available to work at predetermined time-slots. Regardless of the scheduling features provided, the information required for scheduling the employees may be requested from the service engine 145. The service engine 145, in response to receiving a request, accesses the database 165 to obtain the requested information. For example, information regarding employee availability (e.g., whether an employee works day or night or whether he/she is on vacation) may be obtained from the database. In one example, once scheduling of an employee 105 is completed, his/her newly created schedule is forwarded to the service engine 145. The service engine 145, in response, stores the newly created schedule in the database 165.

In one example, the central time manager 140 may utilize the recorded time and/or date information to track employ performance. For example, the central time manager 140 may utilize the recorded to time to determine employee arrival time patterns, etc. Such information may be sent to the employee managers at predetermined intervals or when one or more predetermined thresholds are met.

Figure 2:
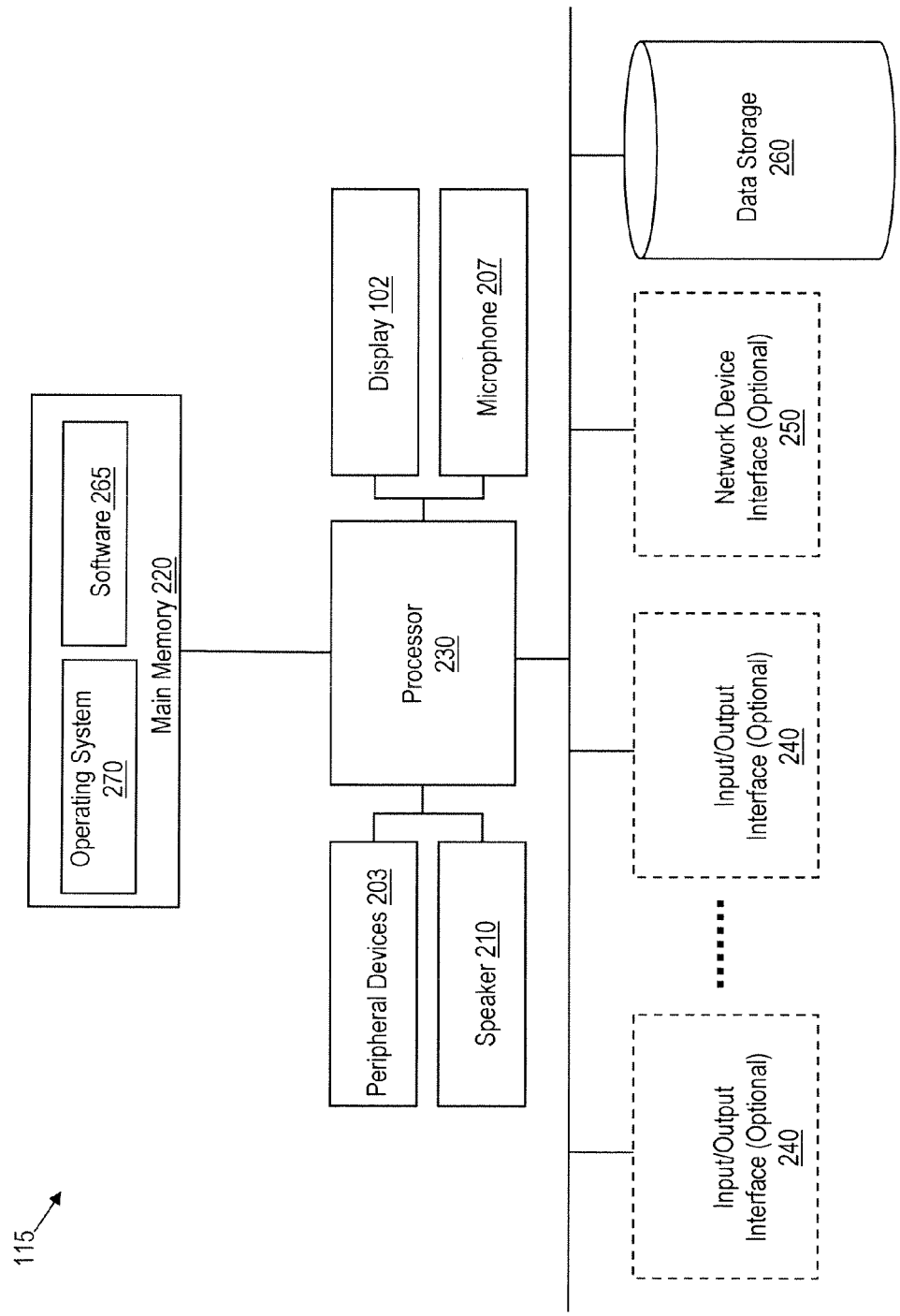
FIG. 2 is an exemplary functional block diagram of a communications device that may be used with the example of FIG. 1.

FIG. 2 is a block diagram of an exemplary communications device 115. The communication device 115 may include a processor 230 (e.g., Central Processing Unit) that is coupled to a memory 220 and arranged to carry out the operations of the device, execute various instructions, and manipulate data structures from the memory 220. The memory 220 may be any appropriate type of computer-readable memory and may include combinations of volatile and non-volatile memory devices. For example, the memory 220 is configured to hold software 265 and firmware in the form of computer-executable instructions as well as data structures. For example, the memory 220 stores computer-executable instructions and data structures that implement aspects of the timekeeping and related management techniques described herein. For example, in some examples, the software 265 includes the time manager application software and implements the required procedures for displaying the time manager interface 150, receiving employee inputs (e.g., of or relating to employee ID 106) through the time manager interface 150, and providing a user (e.g., employee 105 shown in FIG. 1) with information (e.g., summary of hours worked) and indications (e.g., validation messages or error messages).

In one example, the memory 220 includes an operating system 270 that implements various conventional operating system functions including memory management and controlled access to various devices, such as a database storage 260, and task and process scheduling. The data storage 260 may include content, such as images, text, video, audio, and computer applications.

In one example the processor 230 is coupled to various interfaces via an input/output (I/O) device interface 240. The I/O device interface 240 may include logic to interface various input and/or output devices, such as a keypad or mouse with the processor 230, and allow signals and/or data to be transferred between the processor 230 and the external input or output devices coupled to the respective interfaces 240. Further, interface devices such as speaker 210, microphone 207, peripheral devices 203, and display 102 may be used to transfer signals and/or data to/from the processor 230 and memory 220. In one example, the I/O interface 240 includes a USB port (not shown).

For example, the communications device 115 includes a network device interface 250 that provides the communications device 115 with access to a communications network 110. The network interface 250 may be used to transmit and receive the messages and related data used for monitoring, managing, timekeeping, and scheduling of employee work time. For example, the network interface 250 is used to transmit information regarding the employee ID, date, and time an employee 105 (FIG. 1) begins a work session and receive a confirmation message including the date and time recorded for the employee 105.

Figure 3:
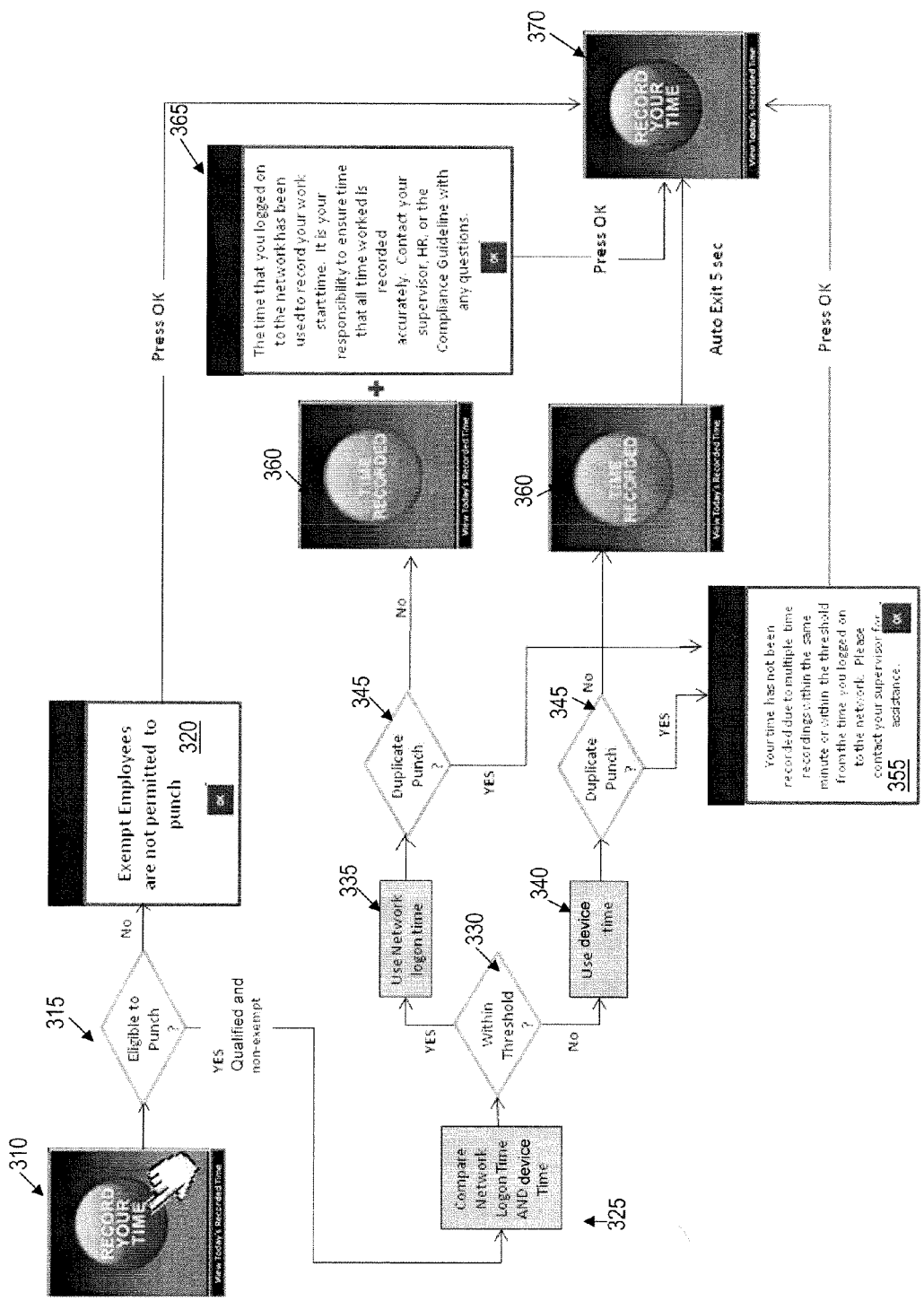
FIG. 3 is a high-level flow diagram of an exemplary procedure for an employee timekeeping function.

FIG. 3 is a high-level flow diagram of an exemplary procedure for an employee timekeeping function that may be used with the system of FIG. 1. An employee 105 (FIG. 1) may initiate recording of his/her time by launching the time manager interface 150 and entering his/her employee ID 106 (FIG. 1) or selecting a time recording button (as shown). The employee ID 106 is verified, as provided in the context of the discussion of FIG. 1, to determine if the employee 105 is eligible to punch in (i.e., use the central time manger 140 record his/her time) 315. Punch in and punch out times, as used herein, are the same as check-in and check-out times. As explained previously, the central time manager 140 may access a database of exempt and/or non-exempt employees to determine punch in eligibility. If the employee 105 is determined to be ineligible to punch in 320, an error message is displayed informing the employee 105 of his/her ineligibility.

As explained above, if the employee 105 is determined to be eligible to punch in (e.g., non-exempt employee 105), network logon time and server time are compared 325. For example, the time the communications device 115 first logged on to the communications network 110 and the time the employee 105 initiated the punch in procedure are compared to obtain a time difference. The obtained time difference is compared against a predetermined threshold 330. If the time difference is below the threshold 335, the network logon time 335 is used to record employee time. If the time difference does not fall below the threshold, the time as indicated by the communications device 115 is used 340.

The central time manager 140 is then consulted to determine if the employee 105 has already punched in his/her time. This may be done by determining if a punch in for the employee 105 has been recently recorded. Some thresholds may be applied in determining what constitutes a recent punch in. For example, if a multiple punch ins are detected in less than a minute, it may be determined that a recent punch in exists. If it is determined that a recent punch in exists, an error message is issued 355 to notify the employee 105 that the most recent punch in time has not been recorded since there are other existing punch in times recorded by the central time manager 140.

If a duplicate time is not detected, employee time is recorded in the database 165 of the central time manager 140. In one example, a notification is issued 360 to the employee 105 to confirm that the employee punch in time has been recorded. In one example, the date and time recorded for the punch in is also displayed in the confirmation message.

In one example, the central time manager 140 determines if the employee 105 has a missing reported time. For example, the central time manager 140 informs the employee that he/she has failed to report the beginning or the end of a work period and request that the employee contact a supervisor to manually record the missing time.

In the event network logon time is used in place of actual punch in time (i.e., device time at the time of punch in), the employee 105 may be notified 365 that network logon time has been used in place of actual punch in time.

As noted previously, in examples in which an employee 105 utilizes a communications device 115 specifically designated for use by that employee 105 to punch in his/her time, the employee 105 may no longer need to enter his/her employee ID 106. In such examples, the employee 105 is able to track his/her time by simply activating the employee ID field 107. The central time manager 140 recognizes the device (e.g., based on its windows login ID that the employee 105 used to login to the network) as belonging to the employee 105 and correctly identifies and records employee time.

Figure 4:
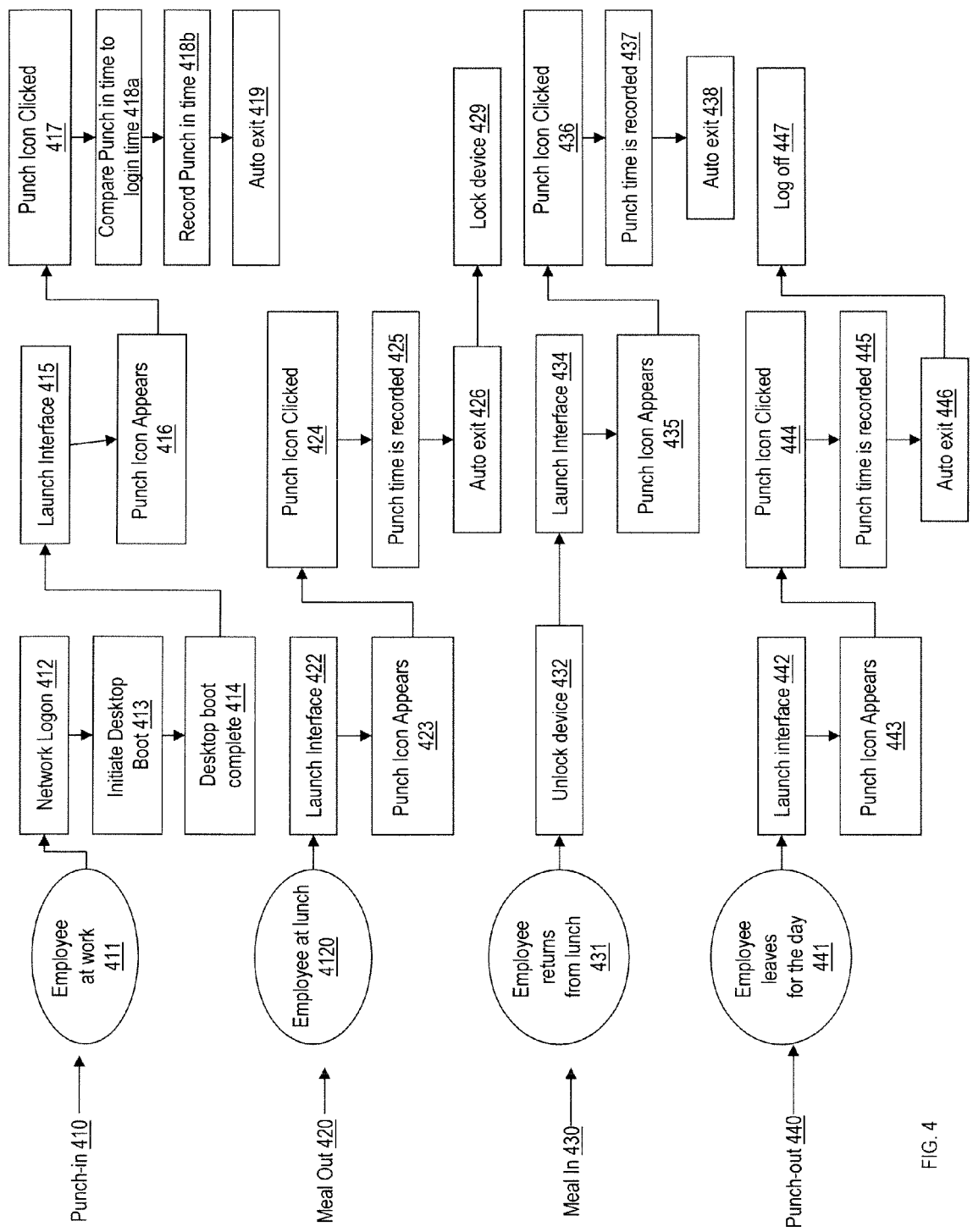
FIG. 4 is a flow diagram that illustrates exemplary timekeeping procedures applicable when working with individually assigned communications devices.

FIG. 4 is a flow diagram that illustrates exemplary timekeeping procedures applicable when working with individually assigned communications devices.

As shown, at check-in time 410, an employee 105 (FIG. 1) reports for work 411. The employee 105 turns on the communications device 115 before he/she can check-in. Upon turning on the communications device 115, the communications device 115 logs onto the communications network and the logon time are recorded 412 (e.g., 9:00 AM logon time). After a not-insubstantial amount of time (e.g., say about 5 minutes), the desktop of the communications device 115 completes its boot up process 413. The desktop with all icons may, therefore, be ready for use at 9:05 AM 414. The employee 105 subsequently launches the time manager interface 415, resulting in the manager interface 415 appearing on the display screen 102 of the communications device 115 (416). Once the interface is launched 416, the employee 105 activates an icon (e.g., the employee ID field 106) (417) to be clicked for the punch-in time. The process of launching and entering data into the time manager interface 415 may take a minute or two. Since the employee 105 is using an individually assigned communications device 115, he/she no longer needs to enter his/her employee ID 106 (FIG. 1). Next, the network login time (9:00) is compared to the actual punch in time (9:07) 418*a*. If smaller than the preset threshold (e.g., 30 minutes), the network login time (9:00) is used as the punch in time 418*b*. The employee 105, after punching his/her time, commences work and the application auto exits after a preset period of time (e.g., 5 seconds) 419.

After some time, for example at meal time 420, the employee 105 punches out 4120 to leave for a period of time designated as lunch time. Again, the employee 105 launches the time manager interface 422, the punch time icon to be clicked (e.g., employee ID field 107 (FIG. 1)) appears 423 and is activated by the employee 105 (block 424). In one example, the employee ID field 107 may appear as a shortcut button signaling the employee 105 to record his/her time. For example, the employee ID field 107 may appear as a button having the text "record your time," included thereon. The check-out time (12:14 PM) is recorded 424. The employee 105, after punching his/her time, leaves for lunch and the application auto exits after a predetermined amount of time (e.g., 5 seconds) 426. In one example, the employee 105 locks the communications device 115 after punching out (e.g., such that it cannot be used by others 429).

At the end of lunch time 430, the employee 105 returns to work 431, unlocks the communications device 115 (block 432), launches the time manager interface 434 and the employee ID field 106 appears 435, and is activated by the employee 105 (block 436). The check-in time (12:45 PM) is recorded 437 in the database of the central manager. The employee 105, after punching his/her time, resumes work, and the application auto exits after some time (e.g., 5 seconds) 438.

After another period of time, at the end of the work day 440, the employee 105 punches out 441 to leave for the day. Again, the employee 105 launches the time manager interface 442, the employee filed 106 appears (block 443), and is activated by the clicked punch time icon (e.g., employee ID 106) (block 444). The check-out time (6:03 PM) is recorded 444 and stored in the database of the central manager. The application auto exits after some time (e.g., 5 seconds) 446. The employee 105 before leaving for the day logs off the communications device 115 447.

Figure 5:
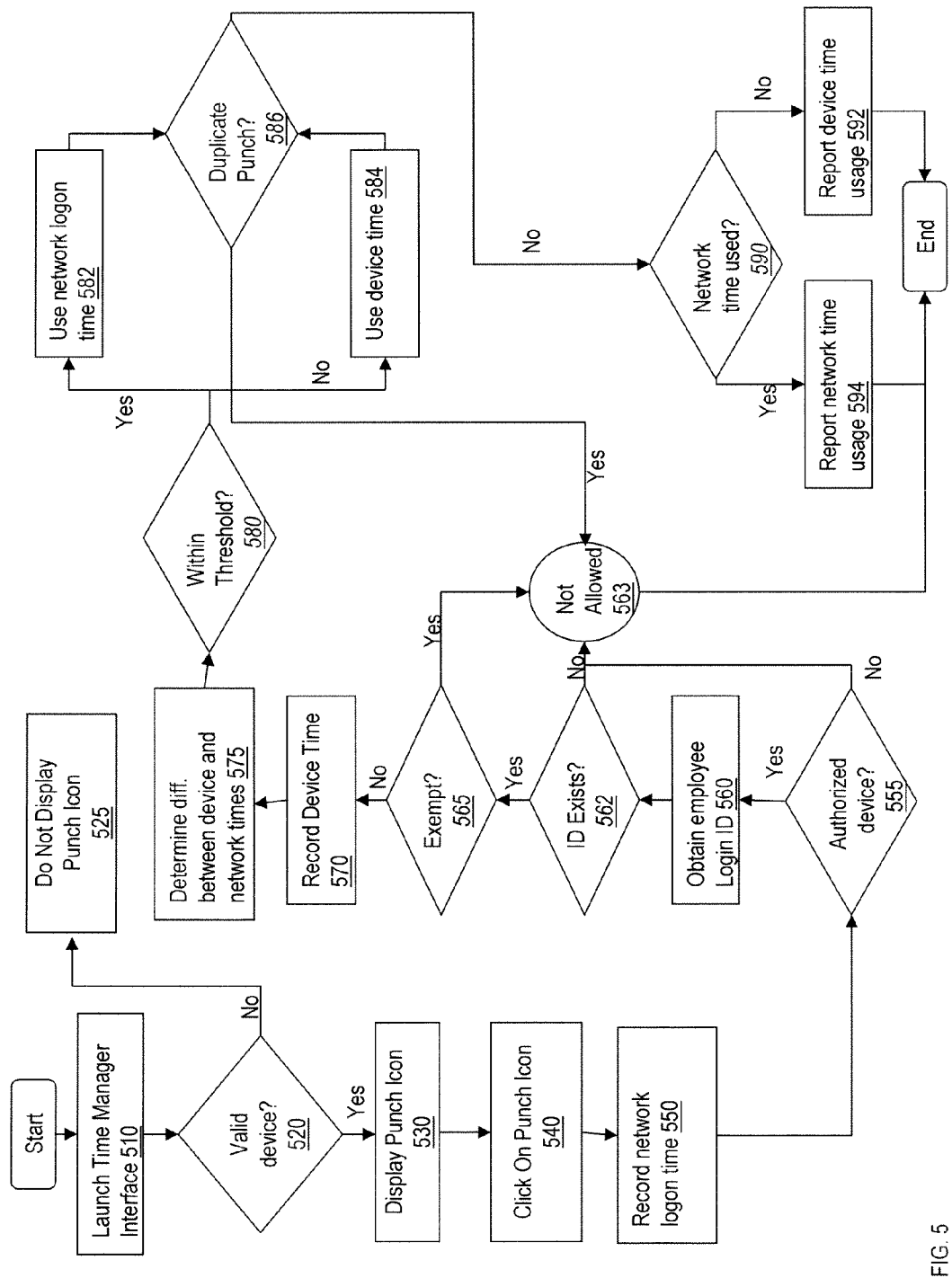
FIG. 5 is a high-level flow diagram of an exemplary timing procedure.

FIG. 5 is a high-level flow diagram of procedures that may be used with some examples disclosed herein when working with individually assigned communications devices.

As stated previously, an employee 105 initiates a time punch by launching the time manager interface 510. For example, the time manager interface is launched in response to the user selecting (e.g., clicking or touching) an icon for the time manager application software. In one example, the icon is included on a desktop of the communications device 115 (shown in FIG. 1). The communications device 115 is then locally authenticated 520 to ensure that it is authorized to launch the time manager interface. In one example, the procedures determine whether the communications device 115 includes the appropriate license for running the time manager interface. For example, a reference table that includes IP addresses of machines for an area is stored in a memory of the communications device. The IP address of the communications device is compared to the one stored in the memory of the communications device to identify the specific location of the communications device.

If the device is validated, the punch time icon (which may be the employee ID field 107) is presented to the employee 105 (block 530). The employee 105 may proceed to check-in by activating the punch time icon (e.g., employee ID field 107) (block 540). As noted before, this may be done by activating (e.g., by a mouse click or touching) a shortcut button that signals the employee 105 to record his/her time by selecting the shortcut button. Once the punch time icon (e.g., employee ID field 107) is activated, network logon time is recorded 550. In one example, all logon time received from the communications devices of an establishment is recorded in one common time zone. The common time zone may be selected based on the location where the central time manager 140 (FIG. 1) is located or based on the location where a central office of an establishment is located. In one example, the logon time is reported in the native time zone, where the communications device 115 is located.

The communications device 115 may further be authenticated 555 by the central time manager 140. As noted previously, the communications device 115 may be authenticated in various manners, for example by verifying its IP address (or its GPS location). If the communications device 115 is not validated, the employee 105 is not allowed to check-in using the device 563.

If the device is authenticated, the device information (e.g., IP address or GPS location) is used, by the central time manager 140, to obtain the employee ID 106. For example, the central time manager determines if the network IP address of the communication device 115 is authorized to provide punch time information. In one example, the employee ID 106 is obtained from a list including the employee IDs 106 that each correspond to the communications device 115. In one example, this list of corresponding employee IDs 106 and communications devices 115 is maintained in the database 165 (FIG. 1) of the central time manager 140. If a corresponding employee ID 106 for the communications device 115 does not exist, the procedures are terminated 563. In one example, an error message appears on the communications device 115 display 102 (FIG. 1) indicating to the employee 105 that an employee ID 106 corresponding to the communications device 115 was not found.

If an employee ID 106 corresponding to the communications device 115 is found, the procedures determine whether the employee 105 is an exempt employee 105 (block 565). As noted previously, the central time manager 140 may maintain a list of exempt, non-exempt, or all employees and their corresponding employment status and compare the employee 105 against one or more of these lists to determine if a match to a list is obtained. If the employee 105 is an exempt employee 105, as explained previously, he/she is not authorized to record time 563. In one example, an error message appears on the communications device display indicating to the employee 105 that, as an exempt employee 105, he/she is not authorized to punch time.

If the employee 105 is deemed non-exempt, the time indicated by the communications device 115, at the time the employee ID field 106 was activated, is recorded 570. The difference between the time indicated by the device (block 570) and the time indicated at network logon (block 550) is then determined. The time difference is compared to a predetermined threshold 580 (e.g., 0-30 minutes). The time threshold may be set by the establishment or the specific work site 101 (FIG. 1) to which the communications device 115 belongs. If the time difference is within the threshold, the network logon time is recorded as the punch time for the employee 105 (block 582). If the time difference is not within the threshold 580 (e.g., more than 30 minutes), the device time (recorded at block 570) is recorded as the punch time for the employee 105 (block 584).

The procedures then determine if any other recent employee punches (i.e., duplicate punches) have been recorded 586. Some time thresholds may be imposed for determining a duplicate punch. For example, in one example, a time punch within the last 60 seconds may be deemed a duplicate punch. If the punch is deemed a duplicate punch, the employee 105 is notified, for example using an error message appearing on the communications device 115 display, that he/she is not permitted to punch time.

If the punch is not a duplicate punch, the procedures determine whether network logon time was recorded for the employee punch time 590. If network logon time was reported, a message may appear on the screen of the communications device 115 indicating to the employee 105 that the network logon time has been used to record his/her punch time 594. If the device time has been recorded for the employee punch time, a message may appear on the screen of the communications device 115 indicating to the employee 105 the time (i.e., punch time) that has been used to record his/her punch time 594.

Although described in terms of visual messages, in one example, one or more of the messages (e.g., error or confirmation messages) announced to the employee 105 are announced using audio messages.

Figure 6:
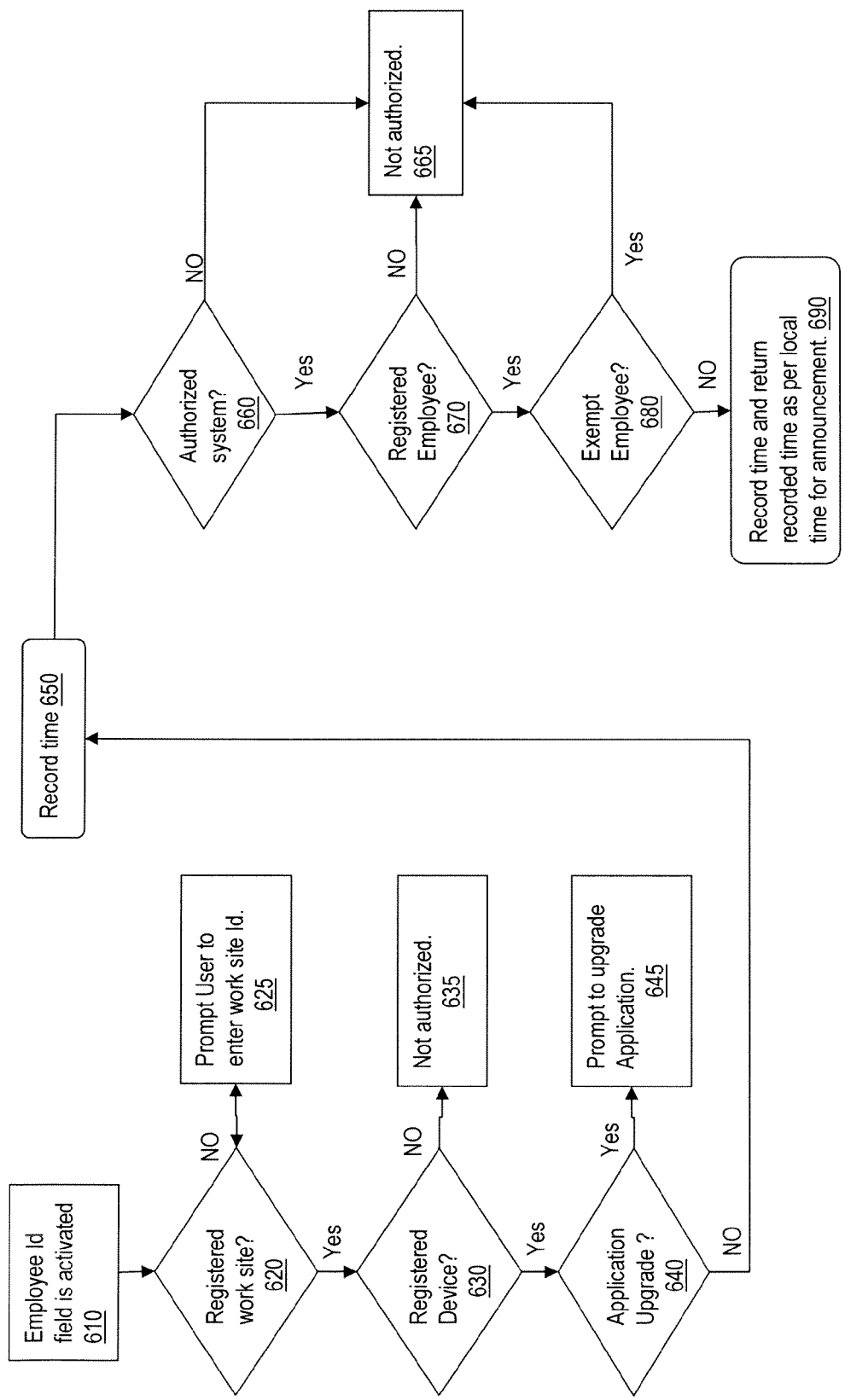
FIG. 6 is a flow diagram of procedures for recording punch time.

FIG. 6 is a flow diagram of procedures for recording punch time. For example, a tablet may be used as a communications device 115 (shown in FIG. 1). As explained previously, the central time manager 140 (shown in FIG. 1) may initiate its time recording procedures in response to activation of an employee ID field 107 appearing on a display screen of a communications device 115 located at a work site (block 610). The employee ID field 107 may be always available on a tablet communications device 115. In one example, the activation of the employee ID field 107 is in response to the employee 105 entering his/her employee ID 106 or activating an employee ID field 107 on a personally assigned communications device 115.

In response to activation of the employee ID field 107, the central time manager 140 determines whether the work site 101 (FIG. 1) including the communications device 115 has been registered with the central time manager 140 (block 620). For example, the security platform 125 determines whether the work site 101 allows its employees to record their time using the central time manager 140. In one example, the security platform 125 maintains a list of authorized work sites 101 and verifies work site registration using the maintained list of work sites 101. If the work site 101 is deemed unregistered, the employee 105 may be prompted to enter his/her work site ID for use in further verification 625.

Once work site registration is verified, the central time manager 140 may determine whether the communications device 115 is an authorized device. This may be done by verifying the IP address or other identifying information of the device against a maintained list of authorized devices. If the device is not authorized, access is not granted 635.

If the device is authorized, the time manager application software running on the communications device 115 may be further verified to ensure that it is not in need of software upgrade 640. If an upgrade is needed, the user may be prompted to upgrade the time manager application software (block 645). If an upgrade is not needed, punch time is recorded 650 for the person who has activated the employee ID filed 107 (block 650).

In one example, the central time manager 140 further determines if the time manager application software is an authorized application (block 660). For example, the central time manager 140 determines whether appropriate licenses for owning and/or executing the time manager application software are in place.

If the time manager application software fails to be verified, it is deemed unauthorized 665. In one example, an error message is issued to the user announcing the failure to authenticate the time manager application software. If the time manager application software is verified, the central time manager 140 determines whether the employee 105 is an exempt employee 105 (block 680). If the employee 105 is an exempt employee 105, he/she does not qualify to record his/her time using the central time manager 140 (block 665). In one example, an error message is issued to the employee 105 indicating his/her ineligibility for using the central time manager 140.

If the employee 105 is a non-exempt employee 105, his/her time is recorded and announced to the employee 105 in that employee's local time zone 690.

Figure 7:
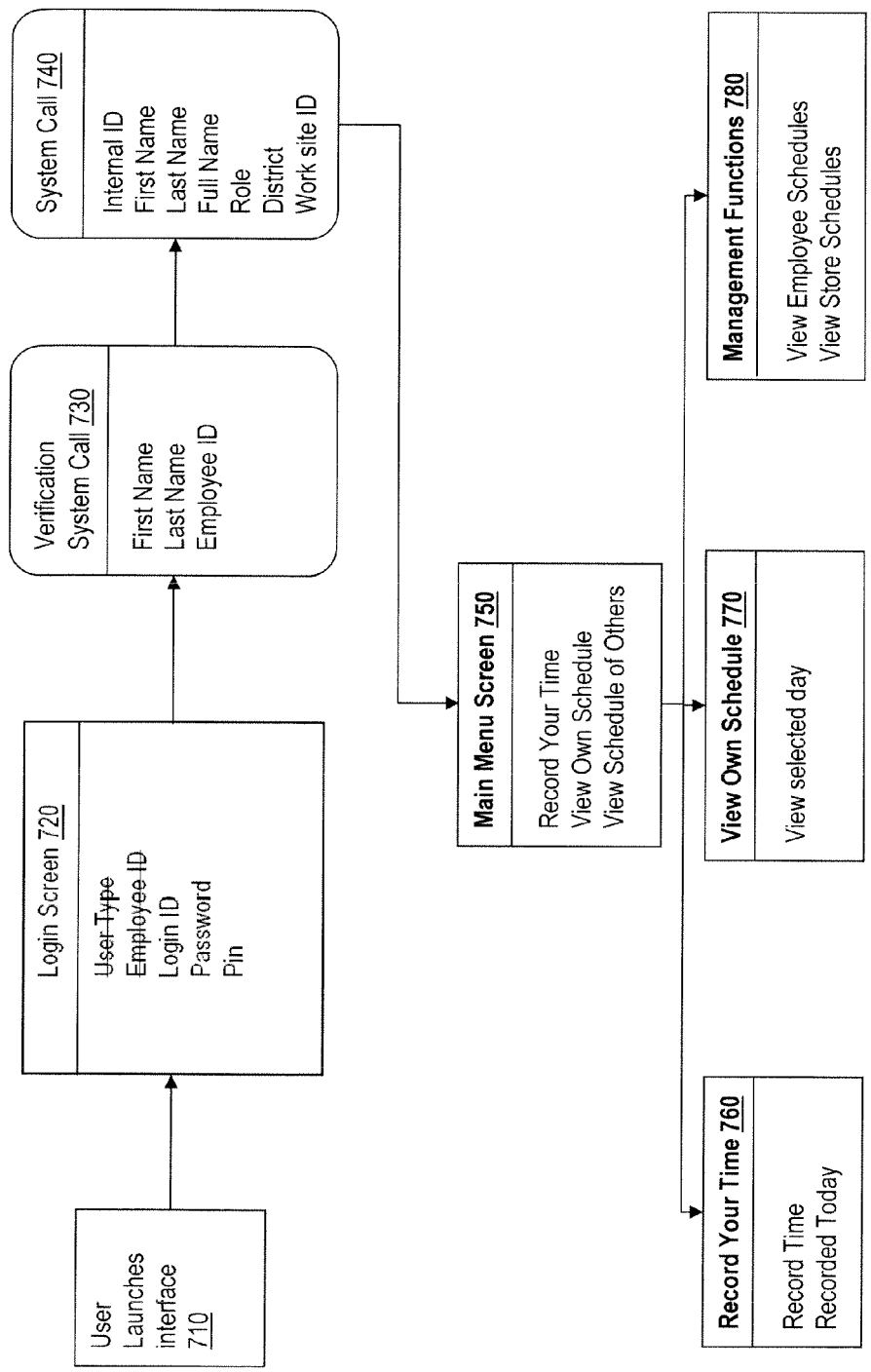
FIG. 7 is a high-level illustration of an exemplary timing procedure.

FIG. 7 is a high-level illustration of an exemplary timing procedure. For example, the procedure begin once the employee 105 launches the time manager interface 410. Once the interface 410 is launched, a login screen appears 720 in which the user may be prompted to enter identifying information, such as login ID, password, or a pin. In response, a verification system call 730 is placed to the service engine 145 via the security platform 125 (shown in FIG. 1) to verify the information entered by the employee 105. The central time manager 140 verifies the information, for example using information stored in a central time manager database 165 (FIG. 1). For example, information such as employee 105 first name, last name, and employee ID 106 are obtained from the database 165 and verified 730. Once the employee is verified, a system call is placed to the central time manager 140 to obtain further information regarding the user, such as internal ID, first name, last name, full name, role, district, and/or work site ID 740. A main menu screen 750 subsequently appears, allowing the user to select from various options, such as recording his/her time, viewing his/her schedule, or performing other managerial functions. The information obtained in the system call 740 may be used to determine if access to various features of the screen (block 750) may be granted to a user.

If the "record your time option" is selected 760, the user may record his/her time or view the time recorded for a some time period. If the "view your schedule option" is selected 770, the user may be able to view his/her schedule for a selected time period (e.g., today's schedule). In one example, if a schedule for a selected time period is not available, the user is informed that the schedule is not available. If "view other schedules" are selected 780, the user may be allowed to view, create, or modify other employee schedules or view, create, or modify a store schedule. The authorizations granted for management functions may be granted based on the information obtained from the system call 740. Further, in one example, a person having managerial functions is able to obtain a listing of work sites, employees at each work site 101, and/or their schedules.

Figure 8:
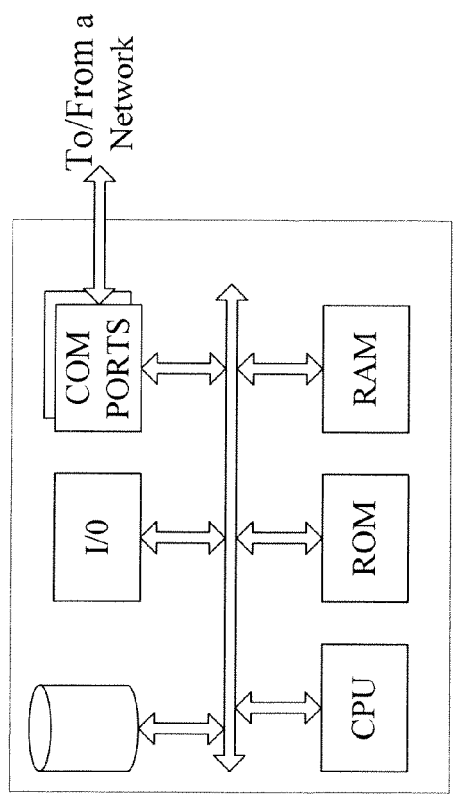
FIG. 8 illustrates a network or host computer.
Figure 9:
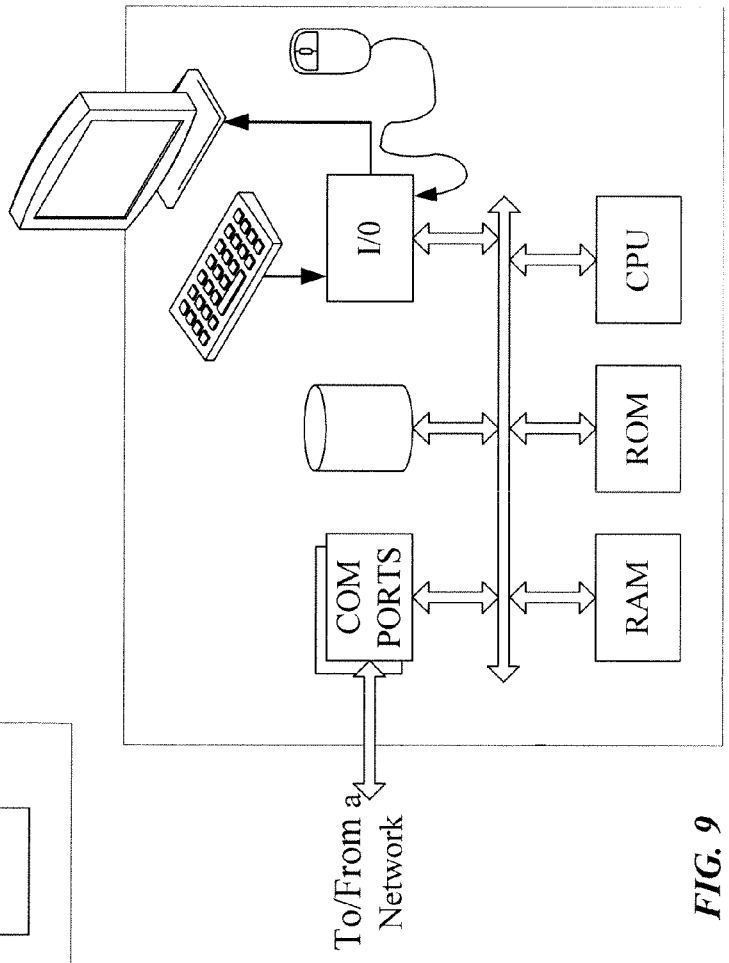
FIG. 9 depicts a computer with user interface elements.

FIGS. 8 and 9 provide functional block diagram illustrations of general purpose computer hardware platforms, as might be used as a server 122, communications device 115, or other computers discussed in the examples above. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that programming and general operation of such computer equipment, and as a result the drawings, should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

For example, aspects of the methods of employee timekeeping, as outlined in the examples above, may be embodied in programming for a server and programming for a communications device (e.g., stationary or mobile). Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly as some the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   at a communications device, receiving an employee check-in time using an interface of the communications device;
   connecting to a communications network after receiving the employee check-in time;
   determining via a processor a time difference between a time at which the communications device gained network connectivity to the communications network and the employee check-in time; and
   in response to determining the time difference is less than a predetermined threshold, recording the network connectivity time as the employee check-in time.

2. The method of claim 1 further including:
   providing a field, positioned within the interface, in which to enter employee information; and
   recording the employee check-in time in response to an entry into the field.

3. The method of claim 1 further including determining identification information of the communications device and in response to determining that the identification information of the communications device is included in a list containing identification information of authorized communications devices associated with the work site, permitting use of the interface to record the check-in time.

4. The method of claim 3 further including maintaining the list at a database positioned remote from the communications device.

5. The method of claim 3 wherein the identification information includes at least one of an Internet Protocol (IP) address associated with the communications device, or a Mobile Device Number (MDN) associated with the communications device.

6. The method of claim 3 wherein the communications device is individually assigned to an employee and further including identifying the employee from the identification information of the communications device.

7. The method of claim 1 further including providing the employee with a field, positioned within the interface, and recording the employee check-in and check-out times in response to receiving identification information from the employee.

8. The method of claim 7 wherein the identification information includes a typable identification code assigned to the employee.

9. The method of claim 7 wherein the identification information includes a typable login ID and password.

10. The method of claim 9 wherein the identification information further includes a typable employee ID.

11. An article comprising a non-transitory computer readable medium and programming on the medium for causing a communication device to:
    receive an employee check-in time using an interface of the communications device;
    connect to a communications network after receiving the employee check-in time;
    determine a time difference between a time at which the communications device gained network connectivity to be communications network and the employee check-in time; and
    in response to determining the time difference is less than a predetermined threshold, record the network connectivity time as the employee check-in time.

12. A system comprising:
    a communications device;
    an interface of the communications device arranged to receive check-in and check-out times from an employee; and
    a processor arranged to:
      receive an employee check-in time from the interface of the communications device;
      connect to a communications network after receiving the employee check-in time;
      determine a time difference between a time at which the communications device gains network connectivity to a communications network and a time at which the employee initiated using the interface for recording employee check-in time; and
      record the network connectivity time as employee check-in time, when the determined time difference is below a predetermined threshold.

13. The system of claim 12 wherein the processor is further arranged to record the time at which the employee initiated using the interface for recording employee check-in time, in when the determined time difference is above the predetermined threshold.

14. The system of claim 12 wherein the interface is further arranged to provide the employee with a field, positioned within the interface, and the processor is further arranged to record the employee check-in and check-out times in response to an entry into the field by the employee.

15. The system of claim 12 wherein the processor is further arranged to verify identification information of the communications device and when the identification information of the communications device is included in a list including identification information of authorized communications devices associated with the work site, authorize the employee to use the interface for recording check-in and check-out times.

16. The system of claim 12 wherein the processor is further arranged to maintain the list including the identification information of authorized communications devices associated with a work site at a database positioned remote from the communications device.

17. The system of claim 12 wherein the identification information includes at least one of an Internet Protocol (IP) address associated with the communications device, or a Mobile Device Number (MDN) associated with the communications device.

18. The system of claim 12 wherein the processor is further arranged to provide the employee with a field, positioned within the interface, and record the employee check-in and check-out times in response to receiving identification information from the employee.

19. The system of claim 18 wherein the identification information includes a typable identification code assigned to the employee.

* * * * *